United States Patent
Yonemoto et al.

(10) Patent No.: US 12,343,952 B2
(45) Date of Patent: Jul. 1, 2025

(54) METHOD FOR PRODUCING LIGHT ABSORPTION ANISOTROPIC FILM

(71) Applicant: FUJIFILM Corporation, Tokyo (JP)

(72) Inventors: Takashi Yonemoto, Kanagawa (JP); Naoki Koito, Kanagawa (JP); Yumi Kato, Kanagawa (JP); Naoyoshi Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 242 days.

(21) Appl. No.: 17/752,415

(22) Filed: May 24, 2022

(65) Prior Publication Data

US 2022/0281191 A1  Sep. 8, 2022

Related U.S. Application Data

(63) Continuation of application No. PCT/JP2020/042728, filed on Nov. 17, 2020.

(30) Foreign Application Priority Data

Dec. 2, 2019  (JP) ................................ 2019-217960
Oct. 16, 2020  (JP) ................................ 2020-174523

(51) Int. Cl.
  *B29C 37/00*  (2006.01)
  *B29D 11/00*  (2006.01)
  (Continued)

(52) U.S. Cl.
  CPC .... *B29D 11/0073* (2013.01); *B29D 11/00865* (2013.01); *C09K 19/3852* (2013.01);
  (Continued)

(58) Field of Classification Search
  CPC ................... B29K 2995/0044; B29D 11/0073
  See application file for complete search history.

(56) References Cited

U.S. PATENT DOCUMENTS 3,051,054 A * 8/1962 Crandon .............. G02B 5/3033
                                                264/1.32
3,711,417 A * 1/1973 Schuler .................... G02C 7/02
                                                252/585
(Continued)

FOREIGN PATENT DOCUMENTS

JP  2010-107975 A  5/2010
JP  2018-053167 A  4/2018
(Continued)

OTHER PUBLICATIONS

WO-2019208299-A1 (Masahiro) Oct. 2019 (online machine translation), [Retrieved on Feb. 5, 2024]. Retrieved from: Espacenet (Year: 2019).*

(Continued)

*Primary Examiner* — Alison L Hindenlang
*Assistant Examiner* — Andres E. Behrens, Jr.
(74) *Attorney, Agent, or Firm* — Edwards Neils LLC; Jean C. Edwards, Esq.

(57) ABSTRACT

Provided is a method for producing a light absorption anisotropic film having a three-dimensional shape and having excellent alignment, which is capable of manufacturing a light absorption anisotropic film having a high degree of polarization even where a three-dimensional shape is provided by heating molding. The method includes a step of producing an intermediate laminate having an optical coating film formed using a liquid crystal composition containing a liquid crystalline compound and a dichroic substance, and an alignment film; a step of heating the intermediate laminate produced by the film forming step to impart a three-dimensional shape; an aligning step of aligning a liquid crystalline component included in the optical coating film in the intermediate laminate imparted with the three-dimensional shape by the heating molding step to produce a light absorption anisotropic film; and a step of curing the (Continued)

light absorption anisotropic film produced by the aligning step.

6 Claims, 1 Drawing Sheet

(51) Int. Cl.
*C09K 19/38* (2006.01)
*C09K 19/56* (2006.01)
*C09K 19/60* (2006.01)
*G02B 5/30* (2006.01)
*G02B 5/00* (2006.01)

(52) U.S. Cl.
CPC ............ *C09K 19/56* (2013.01); *C09K 19/601* (2013.01); *G02B 5/3016* (2013.01); *B29C 37/00* (2013.01); *B29C 37/0028* (2013.01); *B29K 2995/0044* (2013.01); *G02B 5/00* (2013.01); *G02B 5/3083* (2013.01); *G02B 5/3091* (2013.01)

(56) References Cited

U.S. PATENT DOCUMENTS

| | | | | |
|---|---|---|---|---|
| 3,833,289 | A * | 9/1974 | Schuler | G02C 7/108 264/1.32 |
| 3,846,013 | A * | 11/1974 | Cohen | G02C 7/04 351/159.01 |
| 3,940,304 | A * | 2/1976 | Schuler | G02B 5/3033 264/1.32 |
| 5,286,419 | A * | 2/1994 | van Ligten | B29C 69/02 264/2.6 |
| 8,350,995 | B2 * | 1/2013 | Nakayama | G02F 1/134363 385/129 |
| 2005/0003107 | A1 * | 1/2005 | Kumar | G02B 1/10 427/430.1 |
| 2011/0177315 | A1 | 7/2011 | Iwahashi et al. | |
| 2012/0171442 | A1 * | 7/2012 | Yamamoto | C09K 19/3852 427/163.2 |
| 2015/0355491 | A1 * | 12/2015 | Toyama | G02B 5/3083 252/585 |

FOREIGN PATENT DOCUMENTS

| | | | |
|---|---|---|---|
| JP | 2019-194685 A | 11/2019 | |
| WO | 2018/105593 A1 | 6/2018 | |
| WO | WO-2019208299 A1 * | 10/2019 | ............... G02B 1/04 |

OTHER PUBLICATIONS https://jaxchemical.com/wp-content/uploads/2016/07/JAX-Dichroic-FX-Black-SDS.pdf (Year: 2019).*
https://www.forestry-suppliers.com/Documents/2648_msds.pdf (Year: 2015).*
https://www.doitpoms.ac.uk/tlplib/liquid_crystals/phase_transitions.php (Year: 2007).*
International Search Report issued in PCT/JP2020/042728 on Jan. 26, 2021.
Written Opinion issued in PCT/JP2020/042728 on Jan. 26, 2021.
International Preliminary Report on Patentability completed by WIPO on May 17, 2022 in connection with International Patent Application No. PCT/JP2020/042728.

* cited by examiner

METHOD FOR PRODUCING LIGHT ABSORPTION ANISOTROPIC FILM

This application is a Continuation of PCT International Application No. PCT/JP2020/042728 filed on Nov. 17, 2020, which was published under PCT Article 21(2) in Japanese, and which claims priority under 35 U.S.C. § 119(a) to Japanese Patent Application No. 2019-217960 filed on Dec. 2, 2019 and Japanese Patent Application No. 2020-174523 filed on Oct. 16, 2020. The above applications are hereby expressly incorporated by reference, in their entirety, into the present application.

BACKGROUND OF THE INVENTION

1. Field of the Invention

The present invention relates to a method for producing a light absorption anisotropic film.

2. Description of the Related Art

A polarizer is used in various optical devices from the viewpoint of antireflection, suppression of stray light, and the like, but each of members used in the polarizer is required to have a degree of freedom in a shape such as a curved surface due to an improvement in designability and ease of designing.

In the related art, an iodine polarizer has often been used in a polarizer. The iodine polarizer has been manufactured by dissolving iodine, adsorbing the iodine onto a film of a high-molecular-weight material such as polyvinyl alcohol (INA), and stretching the film at a high magnification in one direction, and it has been difficult to sufficiently reduce a thickness of the film. In addition, as described in JP2019-194685A, a stretched PVA had a tendency to have a change in the shape over time, and it was thus hard to use in a curved surface shape.

In recent years, with regard to the iodine polarizer, a polarizing element in which a liquid crystalline compound or a dichroic azo coloring agent is applied onto a substrate such as a transparent film, and the dichroic azo coloring agent is aligned using an intermolecular interaction and the like has been investigated. For example, JP2019-194685A describes, as a polarizer used in a polarizing plate having a curved part, a polarizer having a first surface and a second surface, and having a thickness of 15 μm or less ([Claim 1]), and further describes, as such the polarizer, a polarizer including a polarizing layer including a cured product of a liquid crystal compound and a dichroic coloring agent, in which the dichroic coloring agent is dispersed and aligned ([Claim 4]).

SUMMARY OF THE INVENTION

However, it is necessary to mold a polarizing film into a shape along a curved surface in order to use a polarizer using liquid crystal alignment for the curved surface of an in-vehicle display, a lens, or the like.

In addition, as the molding method, a molding method accompanied by heating (hereinafter also referred to as "heating molding") is known.

The present inventors have conducted studies on the polarizer described in JP2019-194685A, and have thus found that in a case where a three-dimensional shape is provided by heating molding, the alignment of a liquid crystal compound and a dichroic coloring agent is disturbed, and the degree of polarization is thus greatly reduced.

Therefore, an object of the present invention is to provide a method for producing a light absorption anisotropic film having a three-dimensional shape and having excellent alignment, that is, a method for producing a light absorption anisotropic film, capable of manufacturing a light absorption anisotropic dim having a high degree of polarization even in a case where a three-dimensional shape is provided by heating molding.

The present inventors have conducted intensive studies, and as a result, they have found that a method for producing a light absorption anisotropic film having a high degree of polarization even in a case where a three-dimensional shape is provided by heating molding can be provided by carrying out a specific subsequent step after the heating molding.

That is, the present inventors have found that the object can be accomplished by the following configurations.

[1] A method for producing a light absorption anisotropic film, comprising:
   a film forming step of producing an intermediate laminate having an optical coating film formed using a liquid crystal composition containing a liquid crystalline compound and a dichroic substance, and an alignment film;
   a heating molding step of heating the intermediate laminate produced by the film forming step to impart a three-dimensional shape;
   an aligning step of aligning a liquid crystalline component included in the optical coating film in the intermediate laminate imparted with the three-dimensional shape by the heating molding step to produce a light absorption anisotropic film; and
   a curing step of curing the light absorption anisotropic film produced by the aligning step.

[2] The method for producing a light absorption anisotropic film as described in [1],
   in which the aligning step comprises a first step in which the intermediate laminate is set to a first temperature higher than a melting point of the dichroic substance and a second step in which the intermediate laminate is set to a second temperature lower than a nematic transition temperature of the liquid crystalline compound in this order.

[3] The method for producing a light absorption anisotropic film as described in [2],
   in which the heating molding step is a step of performing molding at a temperature higher than the second temperature in the aligning step.

[4] The method for producing a light absorption anisotropic film as described in any one of [1] to [3], further comprising a transfer step between the film forming step and the heating molding step.

According to the present invention, it is possible to provide a method for producing a light absorption anisotropic film, capable of manufacturing a light absorption anisotropic film having a high degree of polarization even in a case where a three-dimensional shape is provided by heating molding.

DESCRIPTION OF THE PREFERRED EMBODIMENTS

Figure 1A:
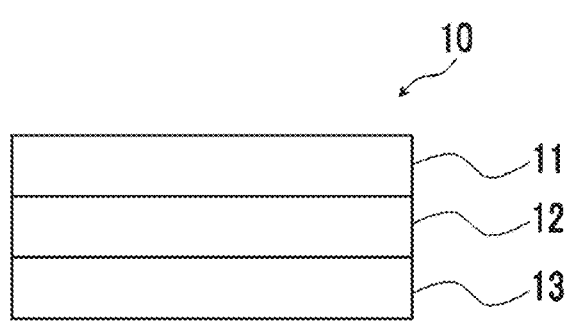
FIGS. 1A and 1B are schematic cross-sectional views showing examples of intermediate laminates obtained from the production method of embodiments of the present invention.

Hereinafter, the present invention will be described in detail.

Description of configuration requirements described below may be made based on representative embodiments of the present invention, but the present invention is not limited to such embodiments.

Furthermore, in the present specification, a numerical range expressed using "to" means a range which includes the preceding and succeeding numerical values of "to" as a lower limit value and an upper limit value, respectively.

In addition, in the present specification, being parallel and being perpendicular do not mean parallel and perpendicular in strict meanings, respectively, but mean ranges within ±5° from being parallel or perpendicular.

Moreover, in the present specification, as each component, a substance corresponding to each component may be used alone or in combination of two or more kinds thereof. Here, in a case where two or more kinds of substances are used in combination for each component, a content of the component refers to a total content of the substances used in combination unless otherwise specified.

Moreover, in the present specification, "(meth)acrylate" is a notation representing "acrylate" or "methacrylate", "(meth)acryl" is a notation representing "acryl" or "methacryl", and "(meth)acryloyl" is a notation representing "acryloyl" or "methacryloyl".

In addition, in the present specification, a liquid crystalline composition and a liquid crystalline compound also encompass those already not exhibiting liquid crystallinity by curing or the like in their concepts.

The method for producing a light absorption anisotropic film of an embodiment of the present invention (hereinafter also simply referred to as "the production method of the embodiment of the present invention") is a method for a light absorption anisotropic comprising a film forming step of producing an intermediate laminate having an optical coating film formed using a liquid crystal composition containing a liquid crystalline compound and a dichroic substance, and an alignment film; a heating molding step; an aligning step; and a curing step in this order.

Hereinafter, each component included in the method for producing a light absorption anisotropic film will be described in detail.

In the present invention, a method for producing a light absorption anisotropic film having a high degree of polarization even in a case where a three-dimensional shape is provided by heating molding can be provided by performing the aligning step and the curing step in this order after the heating molding as described above.

A reason therefor is not specifically clear, but is presumed to be as follows by the present inventors.

In the heating molding, the intermediate laminate is heated until it is soft to a certain extent in order to impart a three-dimensional shape. In this temperature range, the alignment of the liquid crystalline compound and the dichroic substance in the optical coating film in the intermediate laminate is disturbed by thermal relaxation. That is, as shown in Comparative Example 1 which will be described later, in a case of a method in the related art described in JP2019-194685A and the like, that is, in a case of performing heating molding after an aligning step and a curing step, the alignment of a liquid crystalline compound and a dichroic substance is disturbed during the heating molding.

Therefore, in the method for producing a light absorption anisotropic film of the embodiment of the present invention, it is considered that the alignment degree of the light absorption anisotropic film can be increased by providing an aligning step and a curing step after heating molding.

[Film Forming Step]

The film forming step in the production method of the embodiment of the present invention is a step or producing an intermediate laminate having an optical coating film formed using a liquid crystal composition containing a liquid crystalline compound and a dichroic substance, and an alignment film.

The film forming step in the production method of the embodiment of the present invention is preferably a method comprising a step of forming an alignment film (hereinafter also referred to as an "alignment film forming step") and a step of applying a liquid crystal composition which will be described later on the alignment film to form an optical coating film (hereinafter also referred to as an "optical coating film forming step").

[Alignment Film Forming Step]

The alignment film obtained by the alignment film forming step may be any layer as long as it enables the dichroic substance included in the liquid crystal composition to be in a desired alignment state on the alignment film.

Examples of the step of forming an alignment film include methods such as a rubbing treatment of an organic compound (preferably, a polymer) on a film surface, oblique vapor deposition of an inorganic compound, formation of a layer having microgrooves, and accumulation of an organic compound (for example, ω-tricosanoic acid, dioctadecyl methylammonium chloride, methyl stearate, and the like) by a Langmuir-Blodgett method (LB film). Further, an alignment film in which an alignment function is generated by application of an electric field, application of a magnetic field, or light irradiation is also known.

Among those, the step of forming an alignment film preferably comprises a rubbing treatment from the viewpoint of easy control of a pretilt angle of the alignment film, and also preferably comprises a photo-alignment treatment formed by light irradiation from the viewpoint of uniformity of alignment.

<Rubbing Treatment>

The alignment film forming step preferably comprises a rubbing treatment.

A polymer material used for an alignment film formed by the rubbing treatment is described in many documents, and many commercially available products thereof can be used. In the present invention, a polyvinyl alcohol or a polyimide, and derivatives thereof are preferably used. With regard to the alignment film, reference can be made to the descriptions on page 43, line 24 to page 49, line 8 of WO2001/88574A1. A thickness of the alignment film is preferably 0.01 to 10 μm, and more preferably 0.01 to 2 μm.

<Photo-Alignment Treatment>

The alignment film forming step preferably comprises a photo-alignment treatment.

A photo-alignment compound used for an alignment film formed by light irradiation (hereinafter also referred to as a "photo-alignment film") is described in many documents and the like. In the present invention, preferred examples of the photo-alignment compound include the azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP38838488, or JP4151746B, the aromatic ester compounds described in JP2002-229039A, the maleimide and/or alkenyl-substituted nadimide compounds having a photo-alignment unit described in JP2002-265541A or JP2002-317013A, the photo-crosslinkable silane derivatives described in JP420519511 or JP4205198B, and the photo-crosslinkable polyimides, polyamides, or esters described in JP2003-520878A, JP2004-529220A, or JP4162850B. The photo-alignment compound more preferably an azo compound, a photocrosslinkable polyimide, a polyamide, or an ester.

Among those, as the photo-alignment compound, a photosensitive compound having a photoreactive group in which at least one of dimerization or isomerization is caused by the action of light is preferably used.

Examples of the photoreactive group include a group having a cinnamic acid (cinnamoyl) structure (skeleton), a group having a coumarin structure (skeleton), a group having a chalcone structure (skeleton), a group having a benzophenone structure (skeleton), and a group having an anthracene structure (skeleton). Among these groups, the group having a cinnamoyl structure and the group having a coumarin structure are preferable, and the group having a cinnamoyl structure is more preferable.

In addition, the photosensitive compound having a photoaligned group may further have a crosslinkable group.

As the crosslinkable group, a thermally crosslinkable group that causes a curing reaction by the action of heat, or a photocrosslinkable group that causes a curing reaction by the action of light is preferable, and the crosslinkable group may be a crosslinkable group having both the thermally crosslinkable group and the photocrosslinkable group.

Examples of the crosslinkable group include at least one selected from the group consisting of an epoxy group, an oxetanyl group, a group represented by —NH—CH$_2$—O—R (R represents a hydrogen atom or an alkyl group having 1 to 20 carbon atoms), a group having an ethylenically unsaturated double bond, and a blocked isocyanate group. Among these, the epoxy group, the oxetanyl group, and the group having an ethylenically unsaturated double bond are preferable.

Furthermore, the 3-membered cyclic ether group is also referred to as an epoxy group, and the 4-membered cyclic ether group is also referred to as an oxetanyl group.

In addition, specific examples of the group having an ethylenically unsaturated double bond include a vinyl group, an allyl group, a styryl group, an acryloyl group, and a methacryloyl group, and the acryloyl group or the methacryloyl group is preferable.

In the photo-alignment treatment, a photo-alignment film formed from the material is irradiated with linearly polarized light or non-polarized light.

in the present specification, "irradiation of linearly polarized light" and "irradiation of non polarized light" are each an operation for causing a photoreaction to occur in a photo-alignment material. The wavelength of the light used varies depending on the photo-alignment material used and is not particularly limited as long as it is necessary for the photoreaction. A peak wavelength of light used for light irradiation is preferably 200 nm to 700 nm, and ultraviolet rays having a peak wavelength of light of 400 nm or less are more preferable.

A light source used for light irradiation may be a commonly used light source, for example, a lamp such as a tungsten lamp, a halogen lamp, a xenon lamp, a xenon flash lamp, a mercury lamp, a mercury xenon lamp, and a carbon arc lamp, various lasers [for example, a semiconductor laser, a helium neon laser, an argon ion laser, a helium cadmium laser, and an yttrium•aluminum•garnet (YAG) laser], a light emitting diode, and a cathode ray tube.

As a unit with which the linearly polarized light is obtained, a method using a polarizing plate (for example, an iodine polarizing plate, a dichroic substance polarizing plate, and a wire grid polarizing plate), a method using a reflective polarizer with a prism-based element (for example, a Glan-Thompson prism) or a Brewster angle, or a method using light emitted from a laser light source having polarized light can be adopted. In addition, only light at a required wavelength may also be selectively irradiated using a filter, a wavelength conversion element, or the like.

With regard to light to be irradiated, in a case of linearly polarized light, a method of irradiating light from the upper surface or the back surface of the alignment film to the surface of the alignment film orthogonally or obliquely is adopted. The incidence angle of light varies depending on the photo-alignment material, but is preferably 0° to 90° (orthogonal), and more preferably 40° to 90°.

In a case of non-polarized light, the alignment film is irradiated with non-polarized light obliquely. The incidence angle is preferably 10° to 80°, more preferably 20° to 60°, and particularly preferably 30° to 50°.

The irradiation time is preferably 1 minute to 60 minutes, and more preferably 1 minute to 10 minutes.

In a case where patterning is necessary, a method of performing light irradiation using photomask as many times as necessary for pattern formation or a method of writing a pattern by laser light scanning can be adopted.

[Coating Film Forming Step]

The coating film forming step is a step of forming an optical coating film by coating a liquid crystal composition which will be described later on a photo-alignment layer.

The coating film forming step is preferably a method comprising a step of coating a liquid crystal composition which will be described later (hereinafter also referred to as a "coating step") and a step of drying and removing a solvent included in the coated liquid crystal composition (hereinafter also referred to a "drying step").

The liquid crystalline compound in the optical coating film is preferably horizontally aligned by an interaction between the alignment film and an interface modifier (in a case where a liquid crystal composition which will be described later contains the interface modifier).

It is easier to apply a liquid crystal composition onto the alignment film by using a liquid crystal composition containing a solvent or by using a liquid crystal composition in the form of a liquid state material such as a molten liquid by heating or the like.

The coating step is a step of coating a liquid crystal composition which will be described later. From the viewpoint of the alignment properties of the liquid crystal composition, it is preferable to coating the liquid crystal composition on the alignment film.

Examples of a method for coating the liquid crystal composition include known methods such as a roll coating method, a gravure printing method, a spin coating method, a wire bar coating method, an extrusion coating method, a direct gravure coating method, a reverse gravure coating method, a die-coating method, a spray method, and an ink jet method.

The drying step is a step of forming an optical coating film by reducing the amount of the solvent from a coating film obtained in the coating step by heating, blowing, natural drying and/or other methods, and drying the coating film.

<Liquid Crystal Composition>

Hereinafter, each component included in the liquid crystal composition (hereinafter also referred to as "the present composition") used in the coating film forming step which the production method of the embodiment of the present invention comprises will be described in (Liquid Crystalline Compound)

The present composition contains a liquid crystalline compound. By incorporating the liquid crystalline compound into the composition, the dichroic substance can be aligned with a high alignment degree while suppressing the precipitation of the dichroic substance. The liquid crystalline compound is a liquid crystalline compound which does not exhibit dichroism.

The liquid crystalline compound preferably includes a high-molecular-weight liquid crystalline compound, and may further include a low-molecular-weight liquid crystalline compound. Here, the "low-molecular-weight liquid crystalline compound" refers to a liquid crystalline compound having no repeating unit in the chemical structure. In addition, the "high-molecular-weight liquid crystalline compound" refers to a liquid crystalline compound having a repeating unit in the chemical structure.

<High-Molecular-Weight Liquid Crystalline Compound>

Examples of the high-molecular-weight liquid crystalline compound include the thermotropic liquid crystalline polymers described in JP2011-237513A and the high-molecular-weight liquid crystalline compounds described in paragraphs [0012] to [0042] of WO2018/199096A.

The high-molecular-weight liquid crystalline compound may have a crosslinkable group at a terminal thereof from the viewpoint of excellent strength (particularly bending resistance) of the light absorption anisotropic film. Examples of the crosslinkable group include the polymerizable group described in paragraphs [0040] to [0050] of JP2010-244034A. Among these, the acryloyl group, the methacryloyl group, the epoxy group, the oxetanyl group, and the styryl group are preferable, and the acryloyl group and the methacryloyl group are more preferable from the viewpoint of improving reactivity and synthesis suitability.

For a reason that the alignment degree of a light absorption anisotropic film thus obtained is higher, the high-molecular-weight liquid crystalline compound is preferably a high-molecular-weight liquid crystalline compound including a repeating unit represented by Formula (1) (hereinafter also simply referred to as a "repeating unit (1)").

Furthermore, in the following description, "the alignment degree of a light absorption anisotropic film thus obtained is higher" is also referred to as "the effect of the present invention is more excellent".

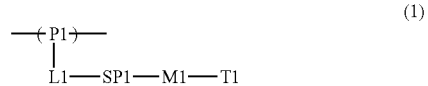

(1)

In Formula (1), P1 represents a main chain of the repeating unit, L1 represents a single bond or a divalent linking group, SP1 represents a spacer group, M1 represents a mesogenic group, and T1 represents a terminal group.

Specific examples of the main chain of the repeating unit represented by P1 include groups represented by Formulae (P1-A) to (P1-D), and among these, the group represented by Formula (P1-A) is preferable from the viewpoints of a diversity of monomers used as raw materials and easy handling.

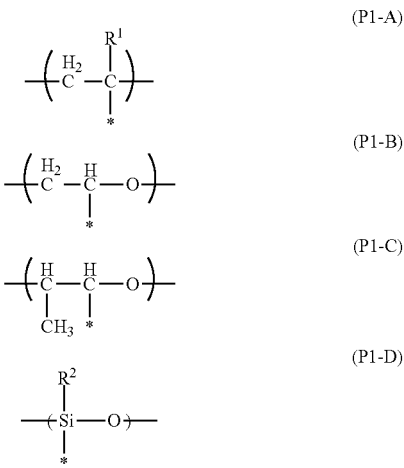

In Formulae (P1-A) to (P1-D), "*" represents a bonding position to L1 in Formula (1). In Formula (P1-A), $R^1$ represents a hydrogen atom or a methyl group. In Formula (P1-D), $R^2$ represents an alkyl group.

For a reason that the effect of the present invention is more excellent, the group represented by Formula (P1-A) is preferably one unit of a partial structure of poly(meth)acrylic acid ester obtained by polymerization of (meth)acrylic acid ester.

For a reason that the effect of the present invention is more excellent, the group represented by Formula (P1-B) is preferably an ethylene glycol unit in polyethylene glycol obtained by polymerization of ethylene glycol.

For a reason that the effect of the present invention is more excellent, the group represented by Formula (P1-C) is preferably a propylene glycol unit obtained by polymerization of propylene glycol.

For a reason that the effect of the present invention is more excellent, the group represented by Formula (P1-D) is preferably a siloxane unit of polysiloxane obtained by polycondensation of silanol.

L1 is a single bond or a divalent linking group.

Examples of the divalent linking group represented by L1 include —C(O)O—, —OC(O)—, —O—, —S—, —C(O)NR³—, —NR³C(O)—, —SO₂—, and —NR³R⁴—. In the formulae, $R^3$ and $R^4$ each independently represent a hydrogen atom, or an alkyl group having 1 to 6 carbon atoms, which may have a substituent.

For a reason that the effect of the present invention is more excellent, in a case where P1 is the group represented by Formula (P1-A), L1 is preferably a group represented by —C(O)O—.

For a reason that the effect of the present invention is more excellent, in a case where P1 is the group represented by each of Formulae (P1-B) to (P1-D), L1 is preferably the single bond.

For reasons of easy exhibition of liquid crystallinity, availability of a raw material, and the like, it is preferable that the spacer group represented by SP1 includes at least one structure selected from the group consisting of an oxyethylene structure, an oxypropylene structure, a polysiloxane structure, and an alkylene fluoride structure.

Here, the oxyethylene structure represented by SP1 is preferably a group represented by *—(CH$_2$—CH$_2$O)$_{n1}$—*. In the formula, n1 represents an integer of 1 to 20, and * represents a bonding position to L1 or M1 in Formula (1). For a reason that the effect of the present invention is more excellent, n1 is preferably an integer of 2 to 10, more preferably an integer of 2 to 4, and most preferably 3.

In addition, for a reason that the effect of the present invention is more excellent, the oxypropylene structure represented by SP1 is preferably a group represented by *—(CH(CH$_3$)—CH$_2$O)$_{n2}$—*. In the formula, n2 represents an integer of 1 to 3, and * represents a bonding position to L1 or M1.

In addition, for a reason that the effect of the present invention is more excellent, the polysiloxane structure represented by SP1 is preferably a group represented by *—(Si (CH$_3$)$_2$—O)$_{n3}$—*. In the formula, n3 represents an integer of 6 to 10, and * represents a bonding position to L1 or M1.

In addition, for a reason that the effect of the present invention is more excellent, the alkylene fluoride structure represented by SP1 is preferably a group represented by *—(CF$_2$—CF$_2$)$_{n4}$—*. In the formula, n4 represents an integer of 6 to 10, and * represents a bonding position to L1 or M1.

The mesogenic group represented by M1 is a group indicating a main skeleton of a liquid crystal molecule which contributes to liquid crystal formation. The liquid crystal molecule exhibits liquid crystallinity which is an intermediate state (mesophase) between a crystalline state and an isotropic liquid state. The mesogenic group is not particularly limited, and reference can be made to, for example, "Flussige Kristalle in Tabellen II" (VEB Deutsche Verlag fur Grundstoff Industrie, Leipzig, published in 1984), particularly the descriptions on pages 7 to 16, and Editorial committee of Liquid Crystal Handbook, liquid crystal handbook (Maruzen Publishing Co., Ltd., published in 2000), particularly the descriptions in Chapter 3.

As the mesogenic group, for example, a group having at least one kind of cyclic structure selected from the group consisting of an aromatic hydrocarbon group, a heterocyclic group, and an alicyclic group is preferable.

For a reason that the effect of the present invention is more excellent, the mesogenic group preferably has aromatic hydrocarbon groups, more preferably has two to four aromatic hydrocarbon groups, and still more preferably has three aromatic hydrocarbon groups.

As the mesogenic group, a group represented by Formula (M1-A) or Formula (M1-B) is preferable, and the group represented by Formula (M1-B) is more preferable from the viewpoints of exhibition of liquid crystallinity, adjustment of a liquid crystal phase transition temperature, availability of a raw material, and synthesis suitability, and for a reason that the effect of the present invention is more excellent.

(M1-A)

(M1-B)

In Formula (M1-A), A1 is a divalent group selected from the group consisting of an aromatic hydrocarbon group, a heterocyclic group, and an alicyclic group. These groups may be substituted with an alkyl group, an alkyl fluoride group, an alkoxy group, or a substituent.

The divalent group represented by A1 is preferably a 4- to 6-membered ring. Moreover, the divalent group represented by A1 may be monocyclic or condensed cyclic.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group, and from the viewpoint of a diversity of design of a mesogenic skeleton, availability of a raw material, or the like, a phenylene group or a naphthylene group is preferable and a phenylene group is more preferable.

The divalent heterocyclic group represented by A1 may be either aromatic or non-aromatic, but is preferably a divalent aromatic heterocyclic group from the viewpoint that the alignment degree is further improved.

Examples of atoms which constitute the divalent aromatic heterocyclic group and are other than carbon include a nitrogen atom, a sulfur atom, and an oxygen atom. In a case where the aromatic heterocyclic group has a plurality of atoms which constitute a ring and are other than carbon, these atoms may be the same as or different from each other.

Specific examples of the divalent aromatic heterocyclic group include a pyridylene group (pyridine-diyl group), a pyridazine-diyl group, an imidazole-diyl group, thienylene (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 is 2 or more, a plurality of A1's may be the same as or different from each other.

In Formula (M1-B), A2 and A3 are each independently a divalent group selected from the group consisting of an aromatic hydrocarbon group, a heterocyclic group, and an alicyclic group. Specific examples and suitable aspects of A2 and A3 are the same as those of A1 in Formula (M1-A), and thus descriptions thereof will be omitted.

In Formula (M1-B), a2 represents an integer of 1 to 10, and in a case where a2 is 2 or more, a plurality of A2's may be the same as or different from each other, a plurality of A3's may be the same as or different from each other, and a plurality of LA1's may be the same as or different from each other. For a reason that the effect of the present invention is more excellent, a2 is preferably an integer of 2 or more, and more preferably 2.

In Formula (M1-B), in a case where a2 is 1. LA1 is a divalent linking group. In a case where a2 is 2 or more, the plurality of LA1's are each independently a single bond or a divalent linking group, and at least one among the plurality of LA1's is a divalent linking group. For a reason that the effect of the present invention is more excellent, in a case where a2 is 2, it is preferable that one of two LA1's is the divalent linking group and the other is the single bond.

In Formula (M1-B), examples of the divalent linking group represented by LA1 include —O—, —(CH$_2$)$_g$, —(CF$_2$)$_g$—, —Si(CH$_3$)$_2$—, —(Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, O—O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (Z, Z', and Z" independently represent a hydrogen atom, a —C≡C—, —N=N—, —S—, —S(O)—, —S(O)(O)—, —(O)S(O)O—, —O(O)S(O)O—, —SC(O)—, and —C(O)S—. Among those, —C(O)O— is preferable for a reason that the effect of the present invention is more excellent. LA1 may be a group obtained by combining two or more of these groups.

Specific examples of M1 include the following structures. Moreover, in the following specific examples, "Ac" represents an acetyl group.

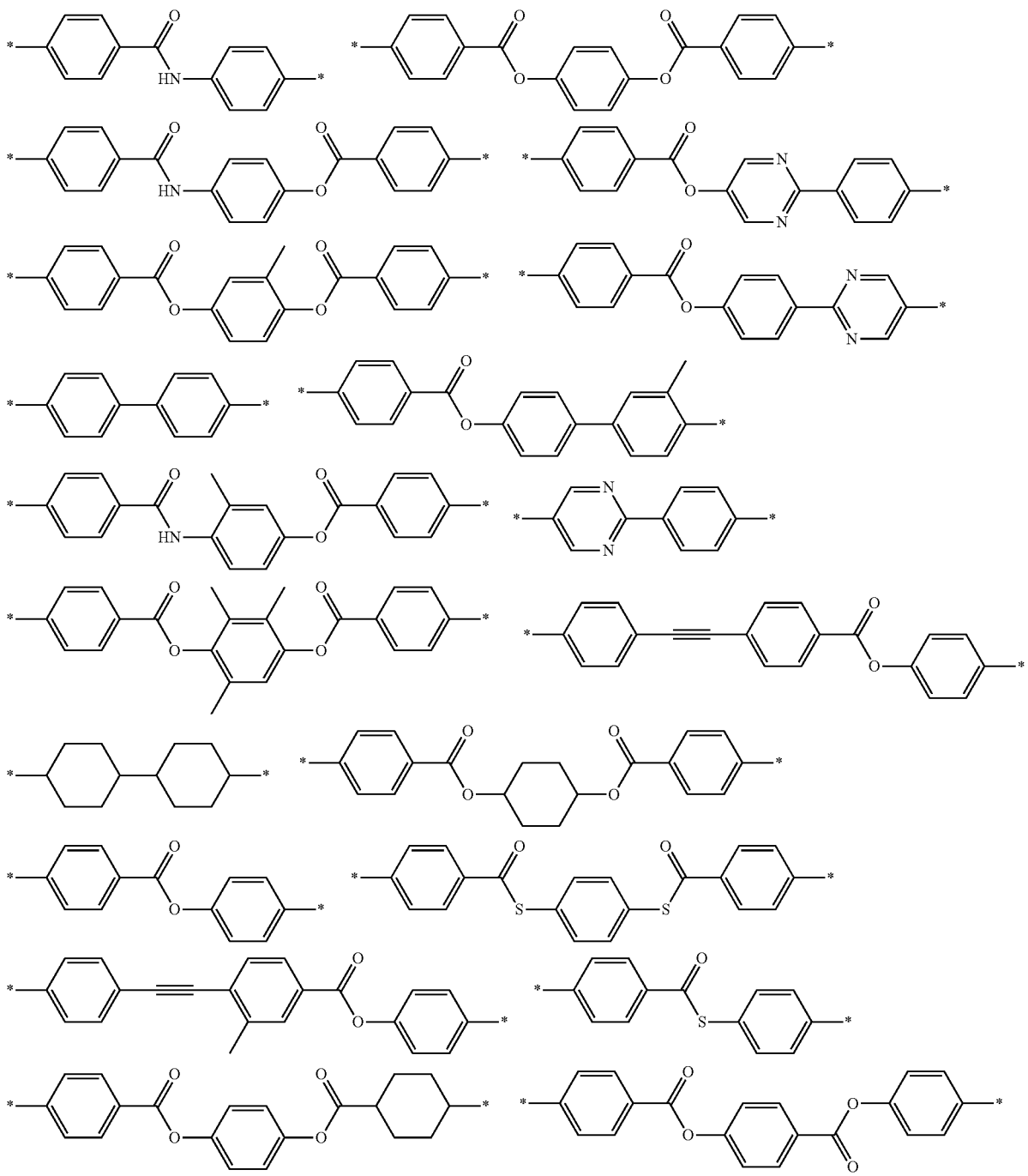

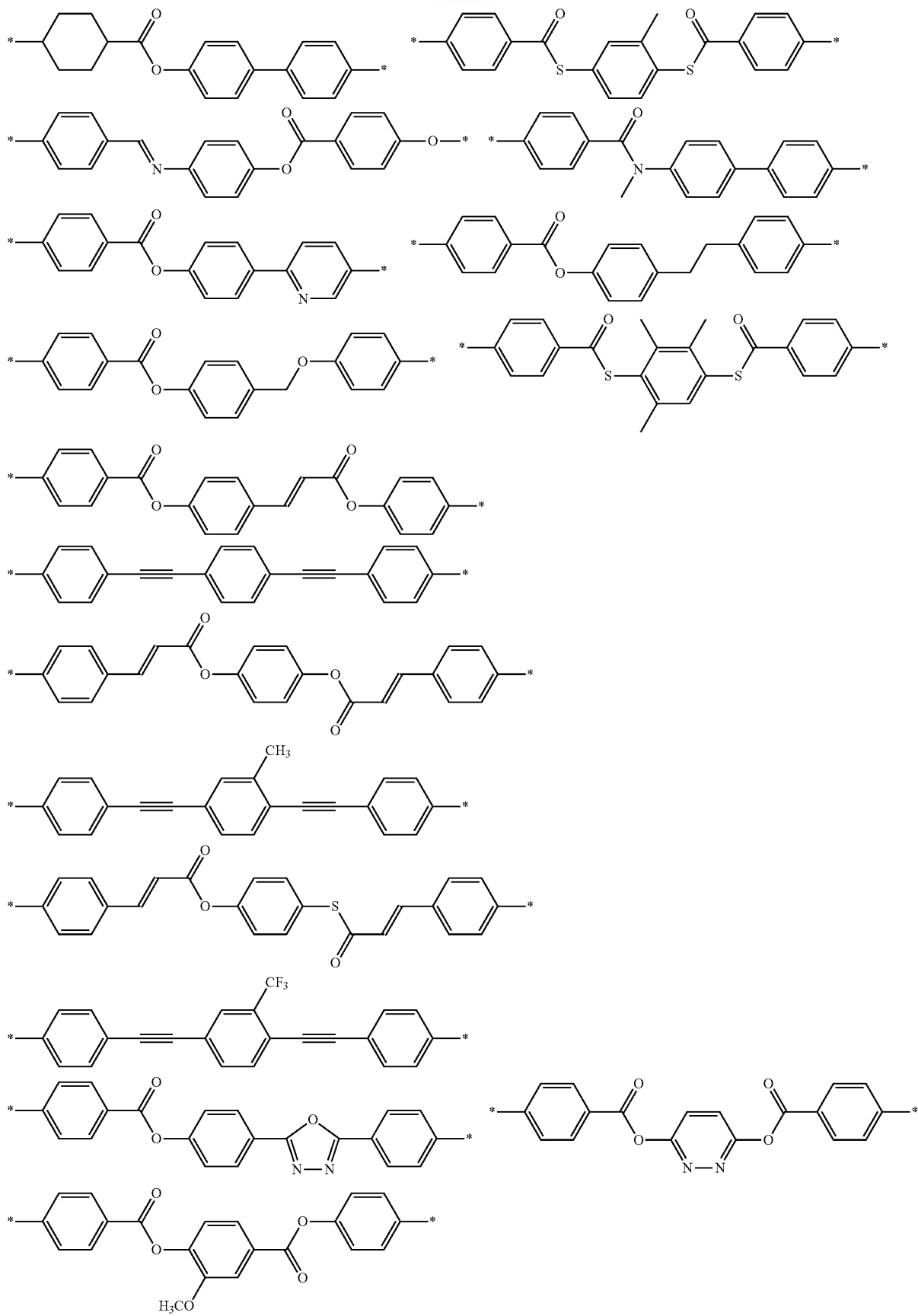

-continued
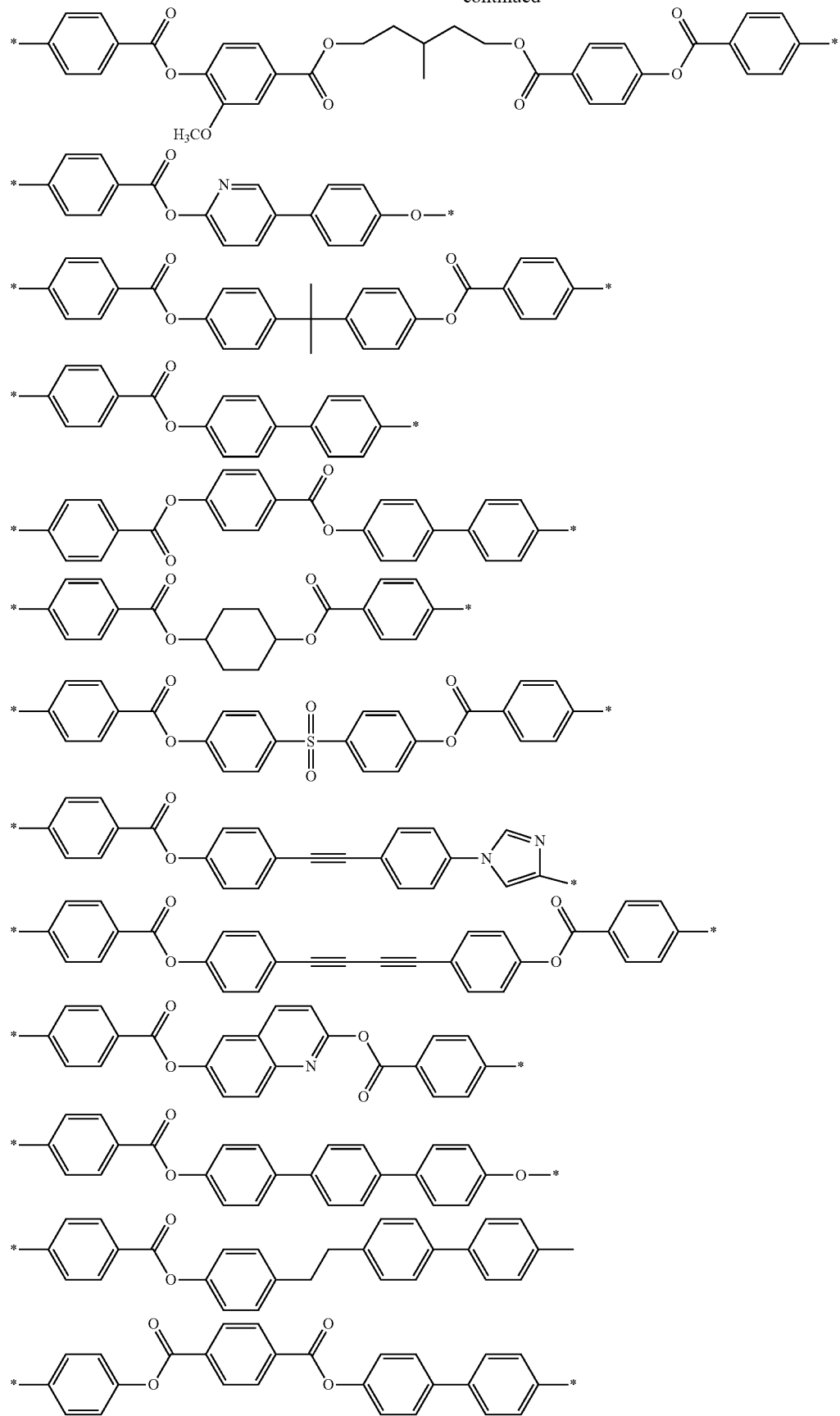

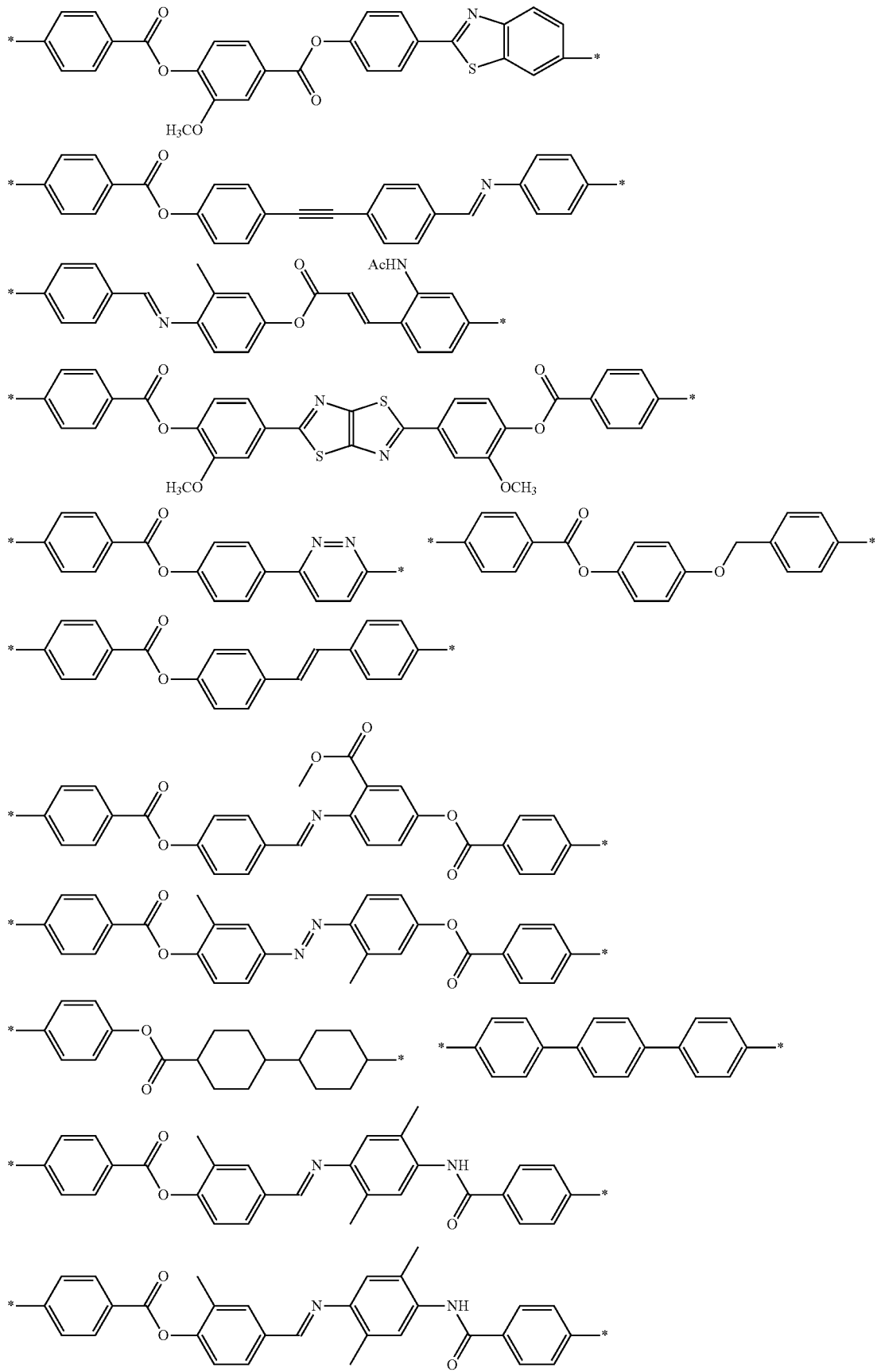

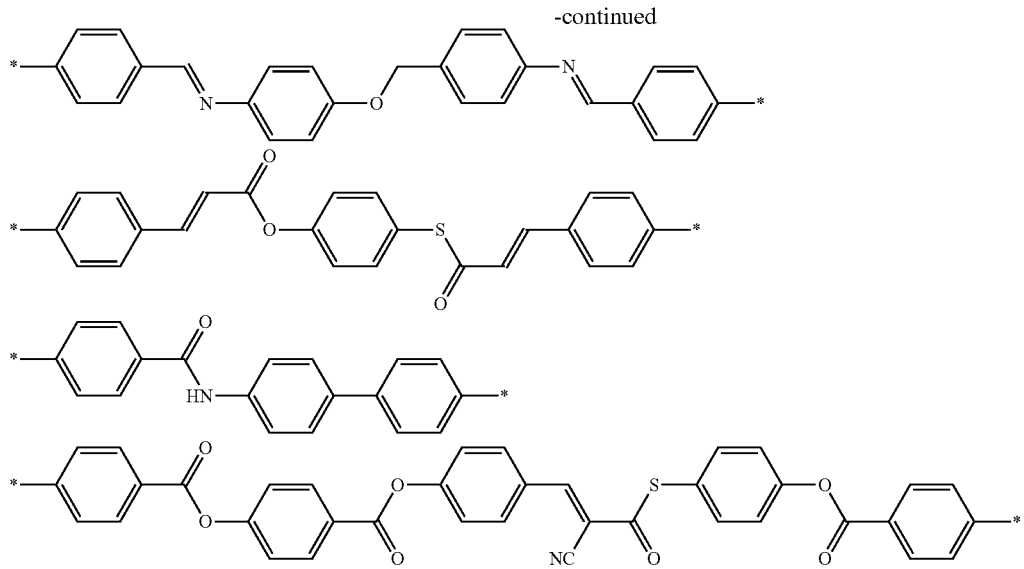

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group (ROC(O)—: R is an alkyl group) having 1 to 10 carbon atoms, an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureide group having 1 to 10 carbon atoms, and a (meth)acryloyloxy group-containing group. Examples of the (meth)acryloyloxy group-containing group include a group represented by -L-A (L represents a single bond or a linking group, specific examples of the linking group are the same as those of L1 and SP1 described above, and A represents a (meth)acryloyloxy group).

For a reason that the effect of the present invention is more excellent, T1 is preferably an alkoxy group having 1 to 10 carbon atoms, more preferably an alkoxy group having 1 to 5 carbon atoms, and still more preferably a methoxy group.

These terminal groups may be further substituted with these groups or the polymerizable group described in JP2010-244038A.

For a reason that the effect of the present invention is more excellent, the number of atoms in the main chain of T1 is preferably 1 to 20, more preferably 1 to 15, still more preferably 1 to 10, and particularly preferably 1 to 7. In a case where the number of atoms m the main chain of T1 is 20 or less, the alignment degree of the polarizer is further improved. Here, the "main chain" in T1 means the longest molecular chain bonded to M1, and the number of hydrogen atoms is not counted as the number of atoms in the main chain of T1. For example, in a case where T1 is an n-butyl group, the number of atoms in the main chain is 4, and in a case where T1 is a sec-butyl group, the number of atoms in the main chain is 3.

For a reason that the effect of the present invention is more excellent, a content of the repeating unit (1 L) is preferably 20% to 100% by mass with respect to 100% by mass of all repeating units in the high-molecular-weight liquid crystalline compound.

In the present invention, a content of each repeating unit included in the high-molecular-weight liquid crystalline compound is calculated based on a charged amount (mass) of each monomer used to obtain each repeating unit.

The high-molecular-weight liquid crystalline compound may include one kind of repeating unit (1 L) alone, or two or more kinds thereof. Among those, two kinds of the repeating units (1 L) are preferably included in the high-molecular-weight liquid crystalline compound for a reason that the effect of the present invention is more excellent.

For a reason that the effect of the present invention is more excellent, in a case where the high-molecular-weight liquid crystalline compound includes two kinds of the repeating units (1 L), it is preferable that the terminal group represented by T1 in one repeating unit (repeating unit A) is an alkoxy group and the terminal group represented by T1 in the other repeating unit (repeating unit B) is a group other than an alkoxy group.

For a reason that the effect of the present invention is more excellent, the terminal group represented by T1 in the repeating unit B is preferably an alkoxycarbonyl group, a cyano group, or a (meth)acryloyloxy group-containing group, and more preferably an alkoxycarbonyl group or a cyano group.

For a reason that the effect of the present invention is more excellent, a proportion (A/B) of the content of the repeating unit A in the high-molecular-weight liquid crystalline compound to the content of the repeating unit B in the high-molecular-weight liquid crystalline compound is preferably 50/50 to 95/5, more preferably 60/40 to 93/7, and still more preferably 70/30 to 90/10.

In addition, the high-molecular-weight liquid crystalline compound may have a repeating unit having no mesogenic group, in addition to a repeating unit (1 L). Examples of the repeating unit having no mesogenic group include a repeating unit in which M1 in Formula (1 L) is a single bond.

In a case where the high-molecular-weight liquid crystalline compound has a repeating unit having no mesogen group, it is preferably more than 0% by mass and 20% by mass or less with respect to 100% by mass of all repeating units of the high-molecular-weight liquid crystalline compound.

For a reason that the effect of the present invention is more excellent, a weight-average molecular weight (Mw) of the high-molecular-weight liquid crystalline compound is preferably 1,000 to 500,000 and more preferably 2,000 to 300,000. In a case where the Mw of the high-molecular-weight liquid crystalline compound is in the range, handling of the high-molecular-weight liquid crystalline compound is easy.

In particular, from the viewpoint of suppression of cracks during application, the weight-average molecular weight (Mw) of the high-molecular-weight liquid crystalline compound is preferably 10,000 or more, and more preferably 10,000 to 300,000.

In addition, from the viewpoint of a temperature latitude of the alignment degree, the weight-average molecular weight (Mw) of the high-molecular-weight liquid crystalline compound is preferably less than 10,000 and more preferably 2,000 or more and less than 10,000.

Here, the weight-average molecular weight and the number-average molecular weight in the present invention are values measured by a gel permeation chromatography (GPC) method.

Solvent (eluent): N-Methylpyrrolidone
Device name: TOSOH HLC-8220GPC
Column: Three columns of TOSOH TSKgel Super AWM-H (6 mm×15 cm) connected to each other are used
Column temperature: 25° C.
Sample concentration: 0.1% by mass
Flow rate: 0.35 mL/min
Calibration curve: Calibration curve obtained from seven samples of TSK standard polystyrene Mw of 2,800,000 to 1,050 (Mw/Mn=1.03 to 1.06) manufactured by Tosoh Corporation is used For a reason that it can improve the shape stability of a film, T1 is preferably a polymerizable group.

The polymerizable group is not particularly limited, but is preferably a polymerizable group which is radically polymerizable or canonically polymerizable.

A known radically polymerizable group can be used as the radically polymerizable group, and suitable examples thereof include an acryloyl group or a methacryloyl group in this case, it is known that the acryloyl group generally has a high polymerization rate, and from the viewpoint of improvement of productivity, the acryloyl group is preferable but the methacryloyl group can also be used in the same manner as the polymerizable group.

A known canonically polymerizable group can be used as the canonically polymerizable group, and specific examples thereof include an alicyclic ether group, a cyclic acetal group, a cyclic lactone group, a cyclic thioether group, a spiroorthoester group, and a vinyloxy group. Among those, the alicyclic ether group or the vinyloxy group is suitable, and an epoxy group, an oxetanyl group, or the vinyloxy group is particularly preferable.

In the present composition, for a reason that it is easy to adjust the compatibility with a dichroic substance which will be described later, a log P value of the high-molecular-weight liquid crystalline compound is preferably 4.0 to 10, more preferably 4.3 to 9.5, and still more preferably 4.3 to 5.5.

Here, the log P value is an index expressing hydrophilicity and hydrophobicity of a chemical structure, and is sometimes referred to as a hydrophilicity/hydrophobicity parameter. The log P value can be calculated using software such as ChemBioDraw Ultra or HSPiP (Ver. 4.1.07). In addition, the log P value can be experimentally determined by the method in OECD Guidelines for the Testing of Chemicals, Sections 1, Test No. 117, and the like. In the present invention, a value calculated by inputting a structural formula of a compound into HSPiP (Ver. 4.1.07) is adopted as the log P value unless otherwise specified.

<Low-Molecular-Weight Liquid Crystalline Compound>

The liquid crystal composition preferably includes a low-molecular-weight liquid crystalline compound.

Here, the "low-molecular-weight liquid crystalline compound" refers to a liquid crystalline compound having no repeating unit in the chemical structure.

Examples of the low-molecular-weight liquid crystalline compound include the liquid crystalline compounds described in JP2013-228706A.

<Content of Liquid Crystalline Compound>

A content of the liquid crystalline compound is preferably 60% to 95% by mass, more preferably 70% to 95% by mass, and particularly preferably 75% to 90% by mass with respect to a total solid content of the present composition. By setting the content of the liquid crystalline compound to be in the range, the alignment degree of the polarizer is further improved.

A content of the high-molecular-weight liquid crystalline compound is preferably 10% to 95% by mass, more preferably 30% to 90% by mass, and particularly preferably 40% to 85% by mass with respect to the total solid content of the present composition. By setting the content of the liquid crystalline compound to be in the range, the alignment degree of the polarizer is further improved.

In a case where the present composition contains a low-molecular-weight liquid crystalline compound, a content of the low-molecular-weight liquid crystalline compound is preferably more than 0% by mass and 95% by mass or less, more preferably 5% to 50% by mass, and particularly preferably 10% to 40% ley mass with respect to the total solid content of the present composition.

(Dichroic Substance)

The dichroic substance contained in the liquid crystal composition is not particularly limited, and is a visible light absorbing substance (dichroic coloring agent), a luminescent substance (a fluorescent substance, a phosphorescent substance), an ultraviolet absorbing substance, an infrared absorbing substance, a nonlinear optical substance, a carbon nanotube, and an inorganic substance (for example, a quantum rod), and dichroic substances (dichroic coloring agents) known in the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of 22001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0005] to [0041] of WO2016/060173A, paragraphs [0008] to [0062] of WO2016/136561A, paragraphs [0014] to

[0033] of WO2017/154835A, paragraphs [0014] to [0033] of WO2017/154695A, paragraphs [0013] to [0037] of WO2017/195833A, paragraphs [0014] to [0034] of WO2018/164252A, and the like.

In the present composition, two or more dichroic substances may be used in combination, and for example, from the viewpoint of bringing a light absorption anisotropic film thus obtained closer to black, it is preferable to use at least one dichroic substance having a maximum absorption wavelength in the wavelength range of 370 to 550 nm and at least one dichroic substance having a maximum absorption wavelength in the wavelength range of 500 to 700 nm in combination.

The dichroic substance may have a crosslinkable group.

Specific examples of the crosslinkable group include a (meth)acryloyl group, an epoxy group, an oxetanyl group, and a styryl group, and among these, the (meth)acryloyl group is preferable.

The dichroic substance may or may not exhibit liquid crystallinity. In a case where the dichroic substance exhibits liquid crystallinity, it may exhibit either a nematic property or a smectic property. A temperature range exhibiting a liquid crystal phase is preferably room temperature (about 20° C. to 28° C.) to 300° C., and more preferably 50° C. to 200° C. from the viewpoint of handleability and manufacturing suitability.

<Content of Dichroic Substance>

For a reason that the effect of the present invention is more excellent, a content of the dichroic substance is preferably 1 to 400 parts by mass, more preferably 2 to 100 parts by mass, and still more preferably 5 to 30 parts by mass with respect to 100 parts by mass of the high-molecular-weight liquid crystalline compound.

In addition, the content of the dichroic substance is preferably 1% to 50% by mass, and more preferably 2% to 40% by mass in the solid content of the liquid crystal composition.

(Polymerization Initiator)

The present composition preferably includes a polymerization initiator.

The polymerization initiator is not particularly limited, but is preferably a photosensitive compound, that is, a photopolymerization initiator.

As the photopolymerization initiator, various kinds of compounds can be used with no particular limitation. Examples of the photopolymerization initiator include the α-carbonyl compound (each of the specifications of U.S. Pat. Nos. 2,367,661A and 2,367,670A), the acyloin ether (the specification of U.S. Pat. No. 2,448,828A), the α-hydrocarbon-substituted aromatic acyloin compound (the specification of U.S. Pat. No. 2,722,512A), the polynuclear quinone compound (each of the specifications of U.S. Pat. Nos. 3,046,127A and 2,951,758A), the combination of a triarylimidazole dimer rind p-aminophenyl ketone (the specification of U.S. Pat. No. 3,549,367A), the acridine and phenazine compounds (JP1985-105667A (JP-S60-105667A) and the specification of U.S. Pat. No. 4,239,850A), the oxadiazole compound (the specification of U.S. Pat. No. 4,212,970A), the o-acyloxime compounds ([0065] of JP2016-27384A), and the acyl phosphine oxide compounds (JP1988-4079913 (JP-S63-40799B), JP1993-29234B (JP-H05-29234B), JP1998-95788A (JP-H10-95788A), and JP1998-29997A (JP-H10-29997A)).

A commercially available product can also be used as such a photopolymerization initiator, and examples thereof include IRGACURE-184, IRGACURE-907, IRGACURE-369, IRGACURE-651, IRGACURE-819, IRGACURE-OXE-01, and IRGACURE-OXE-02, manufactured by BASF SE.

In a case where the present composition contains a polymerization initiator, a content of the polymerization initiator is preferably 0.01 to 30 parts by mass, and more preferably 0.1 to 15 parts by mass with respect to 100 parts by mass of a total amount of the dichroic substance and the high-molecular-weight liquid crystalline compound in the liquid crystal composition. In a case where the content of the polymerization initiator is 0.01 parts by mass or more, the durability of the light absorption anisotropic film is good, whereas in a case where the content of the polymerization initiator is 30 parts by mass or less, the alignment degree of the light absorption anisotropic film is better.

The polymerization initiators may be used alone or in combination of two or more kinds thereof. In a case where the two or more kinds of the polymerization initiators are included, a total amount thereof is preferably in the range.

(Interface Modifier)

The present composition preferably includes an interface modifier.

By incorporating the interface improver into the composition, the smoothness of the coated surface is enhanced, and an effect of further increasing the alignment degree, or an effect of suppressing the occurrence of cissing and unevenness, and enhancing the in-plane uniformity are expected.

As the interface modifier, a material having a dichroic substance and a high-molecular-weight liquid crystalline compound are horizontal on the coating surface side is preferable, and the compound described in paragraphs [0155] to [0170] of WO2016/009648A or the compounds (horizontal alignment agents) described in paragraphs [0253] to [0293] of JP2011-237513A can be used.

In a case where the present composition contains an interface modifier, a content of the interface modifier is preferably 0.001 to 5 parts by mass, and more preferably 0.01 to 3 parts by mass with respect to 100 parts by mass of a total amount of the dichroic substance and the high-molecular-weight liquid crystalline compound in the liquid crystal composition.

The interface modifiers may be used alone or in combination of two or more kinds thereof. In a case where two or more kinds of the interface modifier are included, a total amount thereof is preferably in the range.

(Solvent)

The present composition preferably includes a solvent from the viewpoint of workability or the like.

Examples of the solvent include organic solvents such as ketones (for example, acetone, 2-butanone, methyl isobutyl ketone, cyclopentanone, and cyclohexanone), ethers (for example, dioxane, tetrahydrofuran, 2-methyltetrahydrofuran, cyclopentylmethyl ether, tetrahydropyran, and dioxolane), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, butyl acetate, and ethyl lactate), alcohols (for example, ethanol, isopropanol, butanol, cyclohexanol, isopentyl alcohol, neopentyl alcohol, diacetone alcohol, and benzyl alcohol), cellosolves (for example, methyl cellosolve, ethyl cellosolve, and 1,2-dimethoxyethane), cellosolve acetates, sulfoxides (for example, dimethyl sulfoxide), amides (for example, dimethylformamide, dimethylacetamide, N-methylpyrrolidone, and N-ethylpyrrolidone), and heterocyclic compounds (for example, pyridine), and water. These solvents may be used alone or in combination of two or more kinds thereof.

Among these solvents, ketones (in particular, cyclopentanone and cyclohexanone), ethers (in particular, tetrahydrofuran, cyclopentylmethyl ether, tetrahydropyran, and dioxolane), and amides (in particular, dimethylformamide, dimethylacetamide, N-methylpyrrolidone, and N-ethylpyrrolidone) are preferable from the viewpoint of utilizing the effect of excellent solubility of the liquid crystal composition.

In a case where the present composition includes a solvent, a content of the solvent is preferably 80% to 99% by mass, more preferably 83% to 97% by mass, and particularly preferably 85% to 95% by mass with respect to the total mass of the liquid crystal composition.

The solvents may be used alone or in combination of two or more kinds thereof. In a case where the two or more kinds of the solvents are included, a total amount thereof is preferably in the range.

[Intermediate Laminate]

FIG. 1A shows an example of an intermediate laminate produced by the above-mentioned film forming step.

An intermediate laminate 10 shown in FIG. 1A is a laminate consisting of an optional substrate 11, an alignment film 12, and an optical coating film 13.

<Substrate>

As shown in FIG. 1A, the intermediate laminate may have a substrate.

Here, the substrate can be selected according to the applications of the light absorption anisotropic film, and examples thereof include a glass and a polymer film. A light transmittance of the substrate is preferably 80% or more. From the viewpoint of heating molding suitability, the polymer film is preferable.

Examples of the material for the polymer film include cellulose-based polymers such as triacetyl cellulose (TAC), diacetyl cellulose, and cellulose acetate propionate polycarbonate; acrylic polymers such as a polymethacrylic acid ester and a polyacrylic acid ester; polycarbonate-based polymers; polyester-based polymers such as polyethylene terephthalate and polyethylene naphthalate; styrene-based polymers such as polystyrene and an acrylonitrile•styrene copolymer (AS resin); polyolefin-based polymers such as polyethylene, polypropylene, and an ethylene•propylene copolymer; polymers having an alicyclic structure, such as a norbornene-based polymer, a monocyclic cyclic olefin polymer, a cyclic conjugated diene polymer, and a vinyl alicyclic hydrocarbon polymer; vinyl chloride-based polymers; amide-based polymers such as a nylon and an aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; and epoxy-based polymers; or polymers obtained by mixing these polymers.

On the other hand, a resin substrate having a tan δ peak temperature of 170° C. or lower is preferable as the substrate for a reason that the moldability is easier in the heating molding step. From the viewpoint of enabling the molding treatment at a lower temperature, the tan δ peak temperature is preferably 150° C. or lower, and more preferably 130° C. or lower.

Here, a method for measuring the tan δ will be described. Using a dynamic viscoelasticity measuring device (DVA-200 manufactured by IT Measurement Control Co., Ltd.), E" (loss elastic modulus) and E' (storage elastic modulus) were measured in advance for a film sample which had been humidity-controlled for 2 hours or more in an atmosphere at a temperature of 25° C. and a humidity of 60% Rh, thereby obtain tan δ (=E"/E') as a value as determined.

Device: DVA-200 manufactured by IT Measurement Control Co., Ltd.
Sample: 5 mm, length 50 mm (gap 20 mm)
Measurement conditions: Tension mode
Measurement temperature: −150° C. to 220° C.
Heating conditions: 5° C./min
Frequency: 1 Hz Furthermore, in general, in optical applications, a stretched resin substrate is often used and a tan δ peak temperature thereof often increases by a stretching treatment. For example, in a triacetyl cellulose (TAC) substrate (TG40, manufactured by Fujifilm Corporation), the tan δ peak temperature is 180° C. or higher.

The resin substrate is not particularly limited, and various optical resins can be used. Examples of the optical resin include plastics including, for example, polyolefins such as polyethylene, polypropylene, and a norbornene-based polymer; cyclic olefin-based resins; polyvinyl alcohol; polyethylene terephthalate; polymethacrylic acid esters; and polyacrylic acid esters; polyethylene naphthalate; polycarbonate; polysulfone; polyether sulfone; polyether ketone; and polyphenylene sulfide and polyphenylene oxide. Among those, the cyclic olefin-based resin, polyethylene terephthalate, or the acrylic resin is preferable, and the cyclic olefin resin or the polymethacrylic acid ester is particularly preferable for a reason that it is easily available from the market and has excellent transparency.

Examples of the commercially available resin substrates include TECHNOLLOY S001G, TECHNOLLOY S014G, TECHNOLLOY S000, TECHNOLLOY C001, and TECHNOLLOY C000 (Sumika Acryl Co., Ltd.), LUMIRROR U type, LUMIRROR FX10, and LUMIRROR SF20 (Toray Industries, Inc.), HK-53A (Higashiyama Film Co., Ltd.), TEFLEX FT3 (Teijin DuPont Films Limited), ESCENA" and SCA40 (Sekisui Chemical Co., Ltd.), ZEONOR Film (Optes Co., Ltd.), and ARTON Film (JSR Co., Ltd.).

A thickness of the resin substrate is not particularly limited, but is preferably 5 to 300 μm, more preferably 5 to 100 μm, and still more preferably 5 to 30 μm.

Since the alignment film is as described above, a description thereof will be omitted.

In addition, the optical coating film is obtained by coating the above-mentioned crystal composition. The light absorption anisotropic film of the present invention can be provided by performing the heating molding step, the aligning step, and the curing step of the present invention, which will be described later, in this order.

[Transfer Step]

The production method of the embodiment of the present invention preferably comprises a transfer step between the above-mentioned film forming step and a heating molding step which will be described later. By incorporating the transfer step into the method, it is possible to remove any layer other than the optical coating film, such as the substrate and the alignment film used in the film forming step.

This makes it possible to obtain an intermediate laminate suitable for heating molding which will be described later by affixing the optical coating film to, for example, a new substrate having excellent moldability, and removing the substrate used in the film forming step. For example, in a case where a polymer film consisting of a cellulosic polymer is used as the substrate of the intermediate laminate, it can be transferred to the above-mentioned resin substrate in the transfer step.

An adhesive or a pressure sensitive adhesive used for transfer is not particularly limited, and known materials can be used. Specific examples of a curable adhesive which exhibits adhesiveness by being reacted include an active energy ray curing type adhesive such as a (meth)acrylate-based adhesive, and a cationic polymerization curing type adhesive. Moreover, the (meth)acrylate means acrylate and/or methacrylate. Examples of a curable component in the (meth)acrylate-based adhesive include a compound having a (meth)acryloyl group and a compound having a vinyl group. Furthermore, a compound having an epoxy group or an oxetanyl group can also be used as the cationic polymerization-curable adhesive. The compound having an epoxy group is not particularly limited as long as it has at least two epoxy groups in the molecule, and various curable epoxy compounds generally known can be used. Preferred examples of the epoxy compound include a compound (aromatic epoxy compound) having at least two epoxy groups and at least one aromatic ring in the molecule and a compound (alicyclic epoxy compound) having at least two epoxy groups in the molecule, at least one of which is formed between two adjacent carbon atoms constituting an alicyclic ring.

The film forming step may include a barrier layer forming step, as necessary.

Here, the barrier layer is also called a gas shielding layer (oxygen shielding layer), and has a function of protecting the polarizing element of the present invention from a gas such as oxygen in the air, moisture, compounds included in an adjacent layer, and the like.

With regard to the barrier layer, reference can be made to, for example, the descriptions in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, or paragraphs [0021] to [0031] of JP2005-169994A.

[Heating Molding Step]

The heating molding step in the production method of the embodiment of the present invention is a step of heating the intermediate laminate after the above-mentioned film forming step (a transfer step in a case where the method has the transfer step) to impart a three-dimensional shape.

Here, imparting a three-dimensional shape means deforming the whole or a part of the intermediate laminate having a film shape in the thickness direction and immobilizing the shape. Specific examples thereof include bending the intermediate laminate and imparting an irregular shape to both surfaces or one surface of the intermediate laminate.

Suitable examples for a method of imparting the three-dimensional shape include a method for deforming the intermediate laminate alone, a method for decorating the intermediate laminate at the same time as molding an adherend (primary decoration), and a method for decorating the intermediate laminate after molding the adherend (secondary decoration).

Examples of a method for deforming the intermediate laminate alone include imprinting.

Examples of a method for the primary decoration include an insert molding form (IMF) method, an insert molding label (IML) method, and an insert molding release (IMR) method as a method for decorating the intermediate laminate at the same time as molding of an adherend in a molding process such as injection molding, blow hollow molding, and low-pressure molding compression, which are molding methods for an adherend.

Examples of a method for the secondary decoration method include a three dimension overlay method (TOM) molding.

Among those, the primary decoration and the secondary decoration are preferable, the secondary decoration is more preferable, and the TOM molding is particularly preferable from the viewpoint of ease of molding of a functional thin film.

In addition, the primary decoration and the secondary decoration are performing molding at the same time as a transparent plate having a curved surface or a lens, and are preferable from the viewpoint that they enable the adhesiveness and the uniformity between the light absorption anisotropic film and the adherend to be secured.

<Curved Surface Molding>

In addition, in the heating molding step in the production method of the embodiment of the present invention, it is possible to form a curved surface on the intermediate laminate by heating molding.

By forming a curved surface on the intermediate laminate, the light absorption anisotropic film produced by the production method of the embodiment of the present invention can be used for various articles having a curved surface, and contributes to improvement of functionality or designing properties. For example, the laminate can be used for an in-vehicle display having a curved surface, a lens for a sunglass, a lens for goggles for an image display device, and the like. In addition, the light absorption anisotropic film is also preferably used for the purpose of suppressing stray light in in-vehicle display optical systems such as a head-up display; optical systems such as an augmented reality (AR) eyeglass and a virtual reality (VR) eyeglass; optical sensors such as light detection and ranging (LiDAR), a face recognition system, and a polarization imaging; and the like. Further, the light absorption anisotropic film is also preferably used in combination with a phase difference plate for the purpose of antireflection.

Examples of a method for forming a curved surface by heating molding include insert molding as described in JP2004-322501A, and vacuum molding, injection molding, pneumatic molding, vacuum coating molding, in-mold transfer, and mold pressing, as described in WO2010/1867A or JP2012-116094A.

A temperature required in the heating molding step varies depending on the configuration of the intermediate laminate, the presence or absence of an adherend, and the like. In a case where performing the primary decoration, it is necessary to perform the heating at a molding temperature of the adherend or higher.

In a certain aspect, in a case where an acrylic resin is used for the adherend and the primary decoration is performed by the IMF method at the same time as injection molding, it is necessary to keep the temperature at 150° C. or higher.

In another aspect, in a case where the intermediate laminate includes a substrate, it is necessary to perform the heating at a glass transition point of the substrate or higher.

A processing temperature in the heating molding step is preferably 100° C. or higher and lower than 300° C., more preferably 120° C. or higher and lower than 200° C., and still more preferably 125° C. or higher and lower than 170° C.

In the present invention, it is preferable that the heating molding step is a step of performing the molding at a temperature higher than the second temperature in an aligning step which will be described later for a reason that the moldability is improved.

In a case where the above-mentioned heating is performed, the alignment of the liquid crystalline compound and the dichroic coloring agent compound in the optical coating film is thermally relaxed. In order to prevent the heat relaxation, a method of reducing the mobility of the liquid crystalline compound and the dichroic coloring agent compound by promoting film hardening of the optical coating film can be considered, but the film is harder and requires a high temperature due to the heating molding. That is, the prevention of heat relaxation and the workability are essentially contradictory properties.

[Aligning Step]

The aligning step in the production method of the embodiment of the present invention is a step of aligning the liquid crystalline component included in the optical coating film in the intermediate laminate imparted with a three-dimensional shape by the above-mentioned heating molding step. This makes it possible to obtain a light absorption anisotropic film having a high degree of polarization and having a three-dimensional shape.

Furthermore, the liquid crystalline component is a component including not only the above-mentioned liquid crystalline compound but also a liquid crystal dichroic substance in a case where the above-mentioned dichroic substance has liquid crystallinity.

The aligning step preferably has a first step in which the intermediate laminate after the heating molding step is set to a first temperature higher than a melting point of the dichroic substance and a second step in which the intermediate laminate is set to a second temperature lower than a nematic transition temperature of the liquid crystalline compound in this order (hereinafter also simply referred to as a "specific aspect"). Incidentally, the second temperature is more preferably a temperature lower than the first temperature.

This makes it possible to dissolve the dichroic substance at the first temperature to obtain a uniform optical coating film with few alignment defects, thereby promoting the alignment of the liquid crystalline compound at the second temperature.

Therefore, the alignment of the dichroic substance can be enhanced.

A part of the above-mentioned first step can also serve as a heating molding step. Specifically, in a case where the processing is performed at a first temperature higher than the melting point of the dichroic substance in the heating molding step, an aspect in which the temperature condition in the subsequent aligning step is a temperature lower than the nematic transition temperature of the liquid crystalline compound is included in the above-mentioned specific aspects. In addition, in a case where a mold is used for heating molding, the first step and the second step may be performed in a state where the intermediate laminate is in the mold or on the mold, or may be performed in a state where the mold is removed.

The second step is preferably a step of holding the second temperature for a certain period of time. By holding the liquid crystalline compound at the second temperature, a sufficient alignment time can be obtained even in a case where the fluidity of the liquid crystalline compound is low. The holding time is preferably 5 seconds or longer, preferably 10 seconds or longer, and still more preferably 30 seconds or longer.

The aligning step may have a cooling treatment which is carried out between the first step and the second step, or after the second step. The cooling treatment is a treatment for cooling the heated coating film to approximately room temperature (20° C. to 25° C.). By the cooling treatment, the alignment of the liquid crystalline component included in the coating film can be immobilized. The cooling unit is not particularly limited, and can be carried out by a known method.

Through the steps above, a light absorption anisotropic film can be obtained.

[Curing Step]

The curing step in the production method of the embodiment of the present invention is a step of curing a light absorption anisotropic film thus obtained (that is, a step of immobilizing the alignment state) after the above-mentioned aligning step. The heat resistance of the light absorption anisotropic film can be improved by the curing.

For example, in a case where the light absorption anisotropic film has a crosslinkable group (polymerizable group), the curing step is carried out by heating and/or light irradiation (exposure). Among these, the curing step is preferably carried out by light irradiation.

Various light sources such as infrared light, visible light, and ultraviolet rays can be used as a light source for curing, but the ultraviolet rays are preferable. In addition, the ultraviolet rays may be irradiated while heating at the time of curing or the ultraviolet rays may be irradiated through a filter which transmits only a specific wavelength.

In a case where the exposure is performed while heating, the heating temperature at the time of exposure depends on the transition temperature of the liquid crystalline component included in the light absorption anisotropic film to the liquid crystal phase, but is preferably 25° C. to 140° C.

In addition, the exposure may be performed in a nitrogen atmosphere. In a case where curing of the light absorption anisotropic film proceeds by radical polymerization, it is preferable that exposure is performed in a nitrogen atmosphere since inhibition of polymerization by oxygen is reduced.

In a case where a mold is used for the heating molding, the exposure may be performed in a state where the intermediate laminate is present in or on the mold, or may be performed with the mold removed.

The whole or a part of the mold is preferably a material that transmits the light of a light source used for curing. The material that transmits the light is not particularly limited, but quartz glass is preferably exemplified as the material that transmits ultraviolet rays.

The light absorption anisotropic film obtained by the production method of the embodiment of the present invention has a three-dimensional shape.

Figure 2A:
FIG. 2A is a schematic view showing an example of a light absorption anisotropic film having a three-dimensional shape, obtained from the production method of the embodiment of the present invention.
Figure 2B:
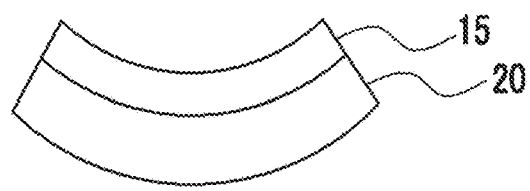
FIG. 2B is a schematic view showing another example of a light absorption anisotropic film having a three-dimensional shape, obtained from the production method of the embodiment of the present invention.
Figure 2C:
FIG. 2C is a schematic view showing another example of a light absorption anisotropic film having a three-dimensional shape, obtained from the production method of the embodiment of the present invention.

As described above, having a three-dimensional shape means being deformed in the thickness direction. FIGS. 2A to 2C each show a schematic view as an example of a light absorption anisotropic film having a three-dimensional shape obtained by the present invention. Here, in FIGS. 2A to 2C, the reference numeral 15 represents a light absorption anisotropic film, and the reference numeral 20 represents an adherend.

It is specifically exemplified that the whole or a part of the light absorption anisotropic film is curved and the light absorption anisotropic film has an irregular shape on one surface or both surfaces.

By having a three-dimensional shape, the light absorption anisotropic film can be used as a polarizing element (polarizing plate) for various articles having a curved surface. For example, the light absorption anisotropic film can be used for a display having a curved surface, a lens for sunglasses, a lens for goggles for an image display device, and the like. With regard to the polarizing plate or the circularly polarizing plate in the present embodiment, the polarizing plate or the circularly polarizing plate can be affixed onto a curved surface or can be integrally molded with a resin, which therefore contributes to an improvement of the designing properties.

The light absorption anisotropic film obtained by the production method of the embodiment of the present invention is preferably integrated with an adherend. By such integration, it is possible to enhance the in-plane uniformity of the light absorption anisotropic film and contribute to an improvement of the design properties of an article comprising the light absorption anisotropic film.

The light absorption anisotropic film obtained by the production method of the embodiment of the present invention can be used as, for example, a polarizing element (polarizing plate). For example, the light absorption anisotropic film can be used as a linearly polarizing plate or as a circularly polarizing plate in a case of being combined with the above-mentioned λ/4 plate.

It is also preferable that the light absorption anisotropic film obtained by the production method of the embodiment of the present invention is used for the purpose of suppressing stray light in in-vehicle display optical systems such as a head-up display, optical systems such as AR eyeglasses and VR eyeglasses, optical sensors such as LiDAR, a face recognition system, and a polarization imaging; and the like. In addition, the polarizing plate or the circularly polarizing plate is also preferably used in combination with a phase difference plate for the purpose of antireflection.

The light absorption anisotropic film obtained by the present invention can be effectively used for particularly an organic EL display panel and an inorganic EL display panel. Since the linearly polarizing plate or as a circularly polarizing plate can be affixed onto a curved surface having a small curvature radius, even in a case where a display device has a curved part at an edge or corner thereof, the polarizing plate can be affixed to cover the curved surface, and can thus contribute to an improvement of the designing properties.

EXAMPLES

The present invention will be described in more detail with reference to following Examples. The materials, the amounts of materials used, the ratios, the treatment details, the treatment procedure, or the like shown in the following Examples can be appropriately modified without departing from the spirit of the present invention. Therefore, the scope of the present invention will not be restrictively interpreted by the following Examples.

Example 1

<Manufacture of Substrate with Alignment Film>

A coating liquid PA1 for forming an alignment film, which will be described later, was continuously applied onto an acrylic resin film (manufactured by Sumitomo Chemical Co., Ltd., S001G) with a wire bar [hereinafter simply referred to as a "support"].

The support on which the coating film was thrilled was dried with hot air at 120° C. for 120 seconds, and subsequently, the coating film was irradiated with polarized ultraviolet rays (10 mJ/cm$^2$, using an ultra-high-pressure mercury lamp) to form a photo-alignment film PA1, whereby a support with a photo-alignment film was obtained.

A film thickness of the photo-alignment film PA1 was 1.0 µm.

| Composition of coating liquid PA1 for forming alignment film | |
|---|---|
| The following polymer PA-1 | 100.00 parts by mass |
| The following acid generator TAG-1 | 5.00 parts by mass |
| The following acid generator CPI-110TF | 0.005 parts by mass |
| Butyl acetate | 1,073.60 parts by mass |
| Methyl isobutyl ketone | 268.40 parts by mass |

Polymer PA-1

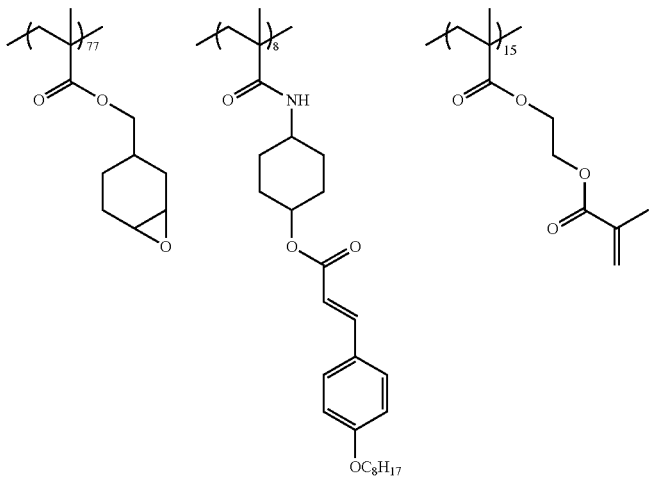

-continued

Composition of coating liquid PA1 for forming alignment film

Acid generator TAG-1

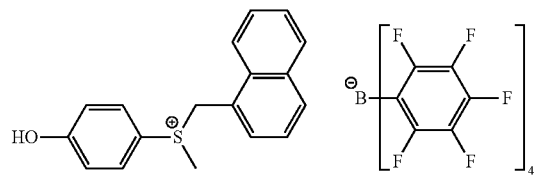

Acid generator CPI-110F

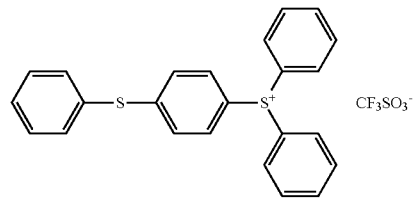

<Formation of Optical Coating Layer P1>

The following liquid crystal composition P1 was continuously applied onto the obtained photo-alignment film PA1 with a wire bar, and then heated at 100° C. for 30 seconds to remove the solvent, thereby forming an intermediate laminate M1 including an optical coating layer.

| Composition of liquid crystal composition P1 | |
|---|---|
| The following azo coloring agent Y-1 | 0.25 parts by mass |
| The following azo coloring agent M-1 | 0.27 parts by mass |
| The following azo coloring agent C-1 | 0.65 parts by mass |
| The following high-molecular-weight liquid crystalline compound P-1 | 3.59 parts by mass |
| Polymerization initiator | 0.200 parts by mass |
| IRGACURE OXE-02 (manufactured by BASF) | |
| The following interface modifier F-1 | 0.013 parts by mass |
| Cyclopentanone | 47.50 parts by mass |
| Tetrahydrofuran | 47.50 parts by mass |

Azo coloring agent Y-1

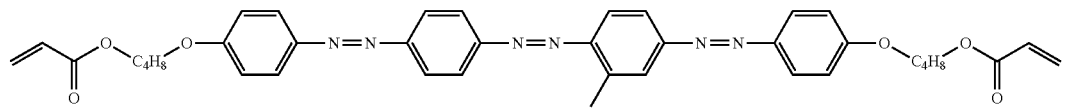

Azo coloring agent M-1

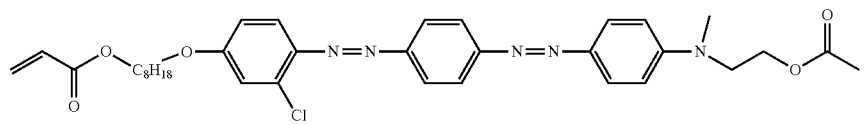

Azo coloring agent C-1

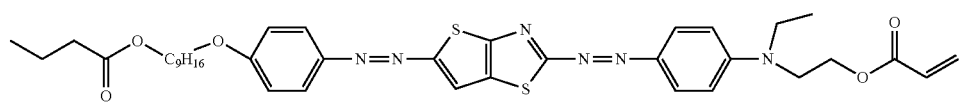

-continued

Composition of liquid crystal composition P1

High-molecular-weight liquid crystalline compound P-1

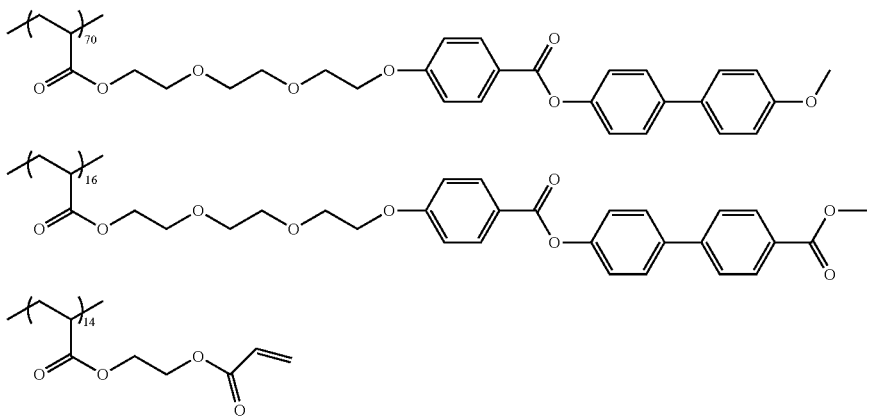

Interface Modifier F-1

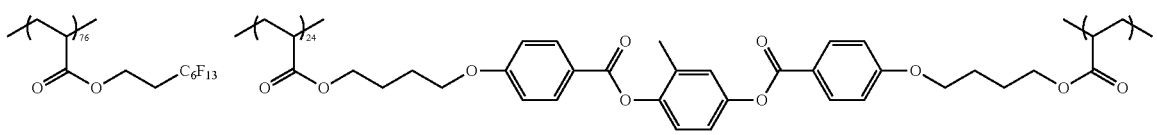

Furthermore, a nematic transition temperature of the high-molecular-weight liquid crystalline compound P-1 was 110° C.

In addition, in a case where the liquid crystal composition P1 was heated to 150° C. and observed with an optical microscope, any of the azo coloring agents Y-1, M-1, and C-1 were dissolved. Therefore, 150° C. was a temperature higher than a melting point of the dichroic substance.

<Heating Molding Step>

An intermediate laminate M1 was set on a metal plate having a partial shape (concave shape) of a spherical surface having a curvature radius of 60 mm, and the edges were held. The shape of the edge is a circle with a diameter of 100 mm. The metal plate was heated to 160° C., and a metallic sphere having a curvature radius of 60 mm that had been heated to the same temperature was pressed against the metal plate to form a curved surface.

<Aligning Step>

Next, the intermediate laminate M1 was held at 50° C. (first temperature) for 90 seconds and the coating layer P1 was cooled to room temperature (23° C.).

Subsequently, the coating layer was heated at 100° C. (second temperature) for 60 seconds and cooled again to room temperature.

<Film Hardening Step>

A light absorption anisotropic film P1 imparted with a three-dimensional shape of Example 1 was manufactured by taking the metallic sphere out, followed by irradiating with light using a light emitting diode (LED) lamp (center wavelength of 365 nm) for 2 seconds under irradiation conditions of an illuminance of 200 mW/cm$^2$.

A film thickness of the light absorption anisotropic P1 was 0.4 μm.

Example 2

<Manufacture of Substrate with Alignment Film>

A coating liquid 2 for forming an alignment film, which will be described later, was continuously applied onto a TAC film TJ40UL (thickness of 40 μm; manufactured by Fujifilm Corporation) [hereinafter simply referred to as a "support"] with a wire bar.

The support on which the coating film was formed was dried with hot air at 340° C. for 120 seconds, and subsequently, the coating thin was irradiated with polarized ultraviolet rays (10 mJ/cm$^2$, using an ultra-high-pressure mercury lamp) to form a photo-alignment film PA2, whereby a TAC film with a photo-alignment film was obtained.

A film thickness of the photo-alignment film PA2 was 1.0 μm.

| Composition of coating liquid PA2 for forming alignment film | |
|---|---|
| The polymer PA-1 | 100.00 parts by mass |
| The acid generator TAG-1 | 5.00 parts by mass |
| The acid generator CPI-110TF | 0.005 parts by mass |
| Xylene | 1,073.60 parts by mass |
| Methyl isobutyl ketone | 268.40 parts by mass |

The liquid crystal composition P1 was continuously applied onto the obtained photo-alignment film PA2 with a wire bar in the same manner as in Example 1, and then heated at 100° C. for 30 seconds to remove the solvent, thereby forming an intermediate laminate M2 including an optical coating layer.

Figure 1B:
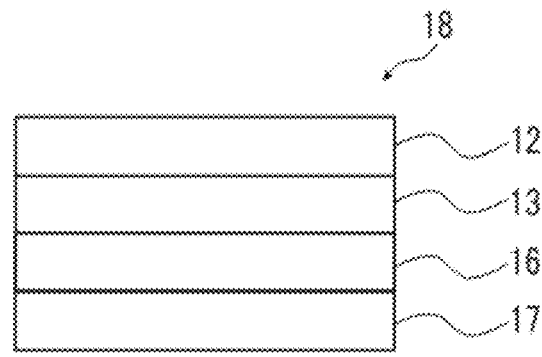

The optical coating layer surface side of the obtained intermediate laminate M2 was affixed to an acrylic resin film (manufactured by Sumitomo Chemical Co., Ltd., S001G) 17 via a pressure sensitive adhesive 16 (see FIG. 1B). Thereafter, the support (TAC film) was removed to obtain an intermediate laminate M2-2 (reference numeral 18 in FIG. 1B).

A light absorption anisotropic film P2 of Example 2 imparted with a three-dimensional shape was obtained by subjecting the obtained intermediate laminate M2-2 to the heating molding step, the aligning step, and the film hardening step in the same manner as in Example 1, except that the processing temperature in the heating molding step was set to 150° C.

Comparative Example 1

A support with the photo-alignment film PA1 was obtained in the same manner as in Example 1.

Next, the liquid crystal composition P1 was continuously applied onto the obtained photo-alignment film PM with a wire bar (film forming step), and then heated at 150° C. for 90 seconds, and the coating layer P1 was cooled to room temperature (23° C.). Subsequently, the coating layer was heated at 100° C. for 60 seconds and cooled again to room temperature (aligning step).

Thereafter, the coating layer was irradiated with light for 2 seconds under an irradiation condition of an illuminance of 200 mW/cm$^2$, using a LED lamp (center wavelength of 365 nm) (exposing step).

Thereafter, the same heating molding step as in Example 1 was performed. The light absorption anisotropic film P3 of Comparative Example 1 was obtained from the above.

Comparative Example 2

A light absorption anisotropic film P4 of Comparative Example 2 was obtained in the same manner as in Comparative Example 1, except that the same heating molding as in Example 1 was performed before performing exposure using an LED lamp (center wavelength of 365 nm), followed by irradiating light for 2 seconds under the irradiation conditions of an illuminance of 200 mW/cm$^2$.

Furthermore, any of the light absorption anisotropic films P1 to P4 were able to impart the intended three-dimensional shape.

<Evaluation of Alignment Degree>

Each of the laminates of Examples and Comparative Examples was set on a sample table in a state where a linear polarizer was inserted into the side of a light source of an optical microscope (manufactured by Nikon Corporation, trade name "ECLIPSE E600 POL"), and a light absorbance of the laminate in a wavelength range of 400 to 700 nm was measured using a multi-channel spectrometer (manufactured by Ocean Optics Inc., trade name "QE65000"), air alignment degree was calculated by the following expression, and the following scores were given thereto.

$$\text{Alignment degree: } S=[(Az0/Ay0)-1]/[(Az0/Ay0)^2]$$

Az0: Absorbance of the laminate with respect to polarized light in the absorption axis direction Ay0: Absorbance of the laminate with respect to polarized light in the polarization axis direction A: The alignment degree was 0.95 or more.

B: The alignment degree was 0.90 or more and less than 0.95.

C: The alignment degree was 0.20 or more and less than 0.90.

D: The alignment degree was less than 0.20.

The results are shown in Table 1 below.

TABLE 1

| | Steps | Alignment degree |
|---|---|---|
| Example 1 | Film forming step → Heating molding step → Aligning step → Exposing step | B |
| Example 2 | Film forming step → Transfer step → Heating molding step → Aligning step → Exposing step | A |
| Comparative Example 1 | Film forming step → Aligning step → Exposing step → Heating molding step | D |
| Comparative Example 2 | Film forming step → Aligning step → Heating molding step → Exposing step | D |

From Examples 1 and 2, a light absorption anisotropic film having a three-dimensional shape and excellent alignment was obtained by a production method comprising an aligning step and an exposing step in this order after a heating molding step.

On the other hand, in the production method comprising a heating molding step after an aligning step according to Comparative Example 1 and Comparative Example 2, a three-dimensional shape was imparted, but a light absorption anisotropic film thus obtained was not sufficiently aligned.

EXPLANATION OF REFERENCES

10: intermediate laminate
11: substrate
12: alignment film
13: optical coating film
15: light absorption anisotropic film
16: pressure sensitive adhesive
17: acrylic resin film
18: intermediate laminate
20: adherend

What is claimed is:

1. A method for producing a light absorption anisotropic film, comprising:
   a film forming step of producing an intermediate laminate having an optical coating film formed using a liquid crystal composition containing a liquid crystalline compound and a dichroic substance, and an alignment film;
   a heating molding step of heating the intermediate laminate produced by the film forming step to impart a three-dimensional shape;
   an aligning step of aligning a liquid crystalline component included in the optical coating film in the intermediate laminate imparted with the three-dimensional shape by the heating molding step to produce a light absorption anisotropic film; and
   a curing step of curing the light absorption anisotropic film produced by the aligning step.

2. The method for producing a light absorption anisotropic film according to claim 1,
   wherein the aligning step comprises a first step in which the intermediate laminate is set to a first temperature higher than a melting point of the dichroic substance and a second step in which the intermediate laminate is set to a second temperature lower than a nematic transition temperature of the liquid crystalline compound in this order.

3. The method for producing a light absorption anisotropic film according to claim 2, wherein the heating molding step is a step of performing molding at a temperature higher than the second temperature in the aligning step.

4. The method for producing a light absorption anisotropic film according to claim 1, further comprising a transfer step between the film forming step and the heating molding step.

5. The method for producing a light absorption anisotropic film according to claim 2, further comprising a transfer step between the film forming step and the heating molding step.

6. The method for producing a light absorption anisotropic film according to claim 3, further comprising a transfer step between the film forming step and the heating molding step.

* * * * *